(12) United States Patent
Minami

(10) Patent No.: US 11,272,147 B2
(45) Date of Patent: *Mar. 8, 2022

(54) PROJECTOR AND PROJECTOR SYSTEM

(71) Applicant: Panasonic Intellectual Property Management Co., Ltd., Osaka (JP)

(72) Inventor: Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 298 days.

This patent is subject to a terminal disclaimer.

(21) Appl. No.: 16/531,236

(22) Filed: Aug. 5, 2019

(65) Prior Publication Data

US 2019/0356888 A1 Nov. 21, 2019

Related U.S. Application Data

(63) Continuation of application No. PCT/JP2017/027429, filed on Jul. 28, 2017.

(30) Foreign Application Priority Data

Mar. 17, 2017 (JP) .............................. JP2017-052793

(51) Int. Cl.
*H04N 9/31* (2006.01)
*G06T 7/50* (2017.01)
(Continued)

(52) U.S. Cl.
CPC ............. *H04N 9/3147* (2013.01); *G01C 3/08* (2013.01); *G06T 7/50* (2017.01); *G06T 7/70* (2017.01); *H04N 9/3185* (2013.01)

(58) Field of Classification Search
CPC .. H04N 9/3147; H04N 9/3185; H04N 9/3194; G06T 7/50; G06T 7/70; G01C 3/80
See application file for complete search history.

(56) References Cited

U.S. PATENT DOCUMENTS 6,222,593 B1 * 4/2001 Higurashi .............. G03B 37/04
315/368.12
9,270,948 B2 * 2/2016 Murata ..................... H04N 7/18
(Continued)

FOREIGN PATENT DOCUMENTS

JP 2004-110804 4/2004
JP 2006-23133 1/2006
(Continued)

OTHER PUBLICATIONS

International Search Report dated Oct. 24, 2017 in International (PCT) Application No. PCT/JP2017/027429.

*Primary Examiner* — Brian P Yenke
(74) *Attorney, Agent, or Firm* — Wenderoth, Lind & Ponack, L.L.P.

(57) ABSTRACT

A projector includes a first projection unit that projects a first image, a first imager that captures a second image projected by another projector, and a first calculation unit. The first calculation unit calculates, from captured image data of the second image captured by the first imager and interval information indicating an interval between the other projector and the projector, a first distance between a surface on which the second image is projected and the other projector, or a second distance between an area in which the second image is projected and the projector. The first projection unit controls projection of the first image based on the first distance or the second distance.

17 Claims, 10 Drawing Sheets

(51) Int. Cl.
*G06T 7/70* (2017.01)
*G01C 3/08* (2006.01)

(56) References Cited

U.S. PATENT DOCUMENTS

| | | | | |
|---|---|---|---|---|
| 9,299,321 | B2* | 3/2016 | Ohno | H04N 9/3147 |
| 9,560,327 | B2* | 1/2017 | Ehara | G03B 21/14 |
| 9,715,865 | B1* | 7/2017 | Hazlewood | G06Q 30/0623 |
| 9,781,397 | B2* | 10/2017 | Minami | H04N 9/3185 |
| 9,843,781 | B1* | 12/2017 | Furui | G06T 7/70 |
| 9,998,719 | B2* | 6/2018 | Wang | H04N 9/3185 |
| 10,298,893 | B2* | 5/2019 | Moule | G06T 7/13 |
| 10,349,023 | B2* | 7/2019 | Kaji | H04N 9/3147 |
| 10,353,282 | B2* | 7/2019 | Yamamoto | H04N 9/3185 |
| 10,516,864 | B2* | 12/2019 | Otani | H04N 13/239 |
| 10,776,898 | B2* | 9/2020 | Aoki | G09G 3/001 |
| 10,798,353 | B2* | 10/2020 | Matsuzawa | H04N 17/002 |
| 10,880,530 | B2* | 12/2020 | Miao | H04N 9/3185 |
| 10,999,565 | B2* | 5/2021 | Fujiune | H04N 9/28 |
| 2004/0041996 | A1 | 3/2004 | Abe | |
| 2004/0223120 | A1* | 11/2004 | Tan | G03B 21/145 353/30 |
| 2004/0246495 | A1 | 12/2004 | Abe | |
| 2004/0252283 | A1* | 12/2004 | Ogawa | H04N 9/3185 353/69 |
| 2005/0024592 | A1* | 2/2005 | Eguchi | G03B 21/26 353/30 |
| 2005/0062939 | A1* | 3/2005 | Tamura | G03B 21/145 353/69 |
| 2008/0036995 | A1* | 2/2008 | Inoue | G01C 1/00 356/5.01 |
| 2009/0201431 | A1* | 8/2009 | Izumida | H04N 9/3194 348/747 |
| 2011/0007283 | A1* | 1/2011 | Tanaka | G03B 21/28 353/70 |
| 2011/0228175 | A1* | 9/2011 | Nicoli | H04N 9/3129 348/745 |
| 2013/0063401 | A1* | 3/2013 | Ouchida | G06F 3/0488 345/175 |
| 2013/0083167 | A1* | 4/2013 | Miyauchi | G03B 21/142 348/46 |
| 2013/0293684 | A1* | 11/2013 | Becker | G01S 7/4808 348/47 |
| 2014/0016041 | A1* | 1/2014 | Kim | H04N 9/3147 348/745 |
| 2015/0077573 | A1* | 3/2015 | Ishikawa | G03B 21/147 348/189 |
| 2016/0119602 | A1* | 4/2016 | Yushiya | G03B 21/00 348/745 |
| 2017/0099472 | A1* | 4/2017 | Minami | H04N 9/3185 |
| 2017/0118451 | A1* | 4/2017 | Sakai | H04N 9/3194 |
| 2017/0264871 | A1* | 9/2017 | Fujiune | H04N 9/3194 |
| 2017/0339382 | A1* | 11/2017 | Furui | H04N 9/315 |
| 2017/0374331 | A1* | 12/2017 | Liu | G03B 21/53 |
| 2018/0120560 | A1* | 5/2018 | Wang | H04N 5/232127 |
| 2018/0278922 | A1* | 9/2018 | Boesen | H04N 9/3194 |
| 2019/0116356 | A1* | 4/2019 | Matoba | G09G 5/377 |
| 2019/0215500 | A1* | 7/2019 | Yamagishi | G06T 7/70 |
| 2019/0385330 | A1* | 12/2019 | Bachhuber | H04N 9/3194 |
| 2020/0082496 | A1* | 3/2020 | Chong | G06T 3/005 |

FOREIGN PATENT DOCUMENTS

| | | |
|---|---|---|
| JP | 2006-170744 | 6/2006 |
| JP | 3941631 | 7/2007 |
| JP | 4556555 | 10/2010 |

* cited by examiner

PROJECTOR AND PROJECTOR SYSTEM

BACKGROUND

1. Technical Field

The present disclosure relates to a projector that calculates a distance between a projector and a projection target surface of an image projected by the projector, and to a projector system.

2. Description of the Related Art

PTL 1 discloses a three-dimensional image acquisition method and an apparatus that acquire distance information along with brightness information by a triangulation method using a projection system and one or a plurality of cameras.

Here, PTL 1 is Japanese Patent No. 4556555.

SUMMARY

A projector of the present disclosure includes a first projection unit that projects a first image, a first imager that captures a second image projected by another projector, and a first calculation unit. The first calculation unit calculates, from captured image data of the second image captured by the first imager and interval information indicating an interval between the other projector and the projector, a first distance between a surface on which the second image is projected and the other projector, or a second distance between an area in which the second image is projected and the projector. The first projection unit controls projection of the first image based on the first distance or the second distance.

A projector system according to one aspect of the present disclosure includes a first projector that projects a first image, a second projector that projects a second image, and a control box that performs communication with the first projector and the second projector. The first projector includes a first projection unit that projects a first image, a first imager that captures the second image, and a first communication unit that transmits position information of the first projector and captured image data of the second image captured by the first imager. The second projector includes a second communication unit that transmits position information of the second projector. The control box includes a third communication unit and a third calculation unit. The third communication unit receives the position information of the first projector and the captured image data from the first communication unit, and receives the position information of the second projector from the second communication unit. The third calculation unit calculates, from the position information of the first projector and the position information of the second projector, interval information indicating an interval between the first projector and the second projector, and calculates, from the captured image data and the interval information, a first distance between a surface on which the second image is projected and the second projector, or a second distance between an area in which the second image is projected and the first projector. The control box controls projection of the first image by the first projection unit based on the first distance or the second distance.

A projector system according to another aspect of the present disclosure includes a first projector that projects a first image, a second projector that projects a second image, an imaging device that captures the second image, and a calculation unit. The calculation unit calculates, from captured image data of the second image captured by the imaging device and position information of the first projector, the second projector, and the imaging device, a first distance between a surface on which the second image is projected and the second projector, or a second distance between an area in which the second image is projected and the imaging device. The first projector controls projection of the first image based on the first distance or the second distance.

DETAILED DESCRIPTION

Exemplary embodiments will be described in detail below with reference to the drawings as appropriate. However, a detained description more than necessary may be omitted. For example, a detailed description of a well-known matter and a duplicated description of substantially the same configuration may be omitted. This is to avoid unnecessary redundancy in the following description and to facilitate understanding by those skilled in the art.

Note that the accompanying drawings and the following description are provided to allow those skilled in the art to sufficiently understand the present disclosure, and are not intended to limit the subject matters described in the claims.

First Exemplary Embodiment

Figure 1:
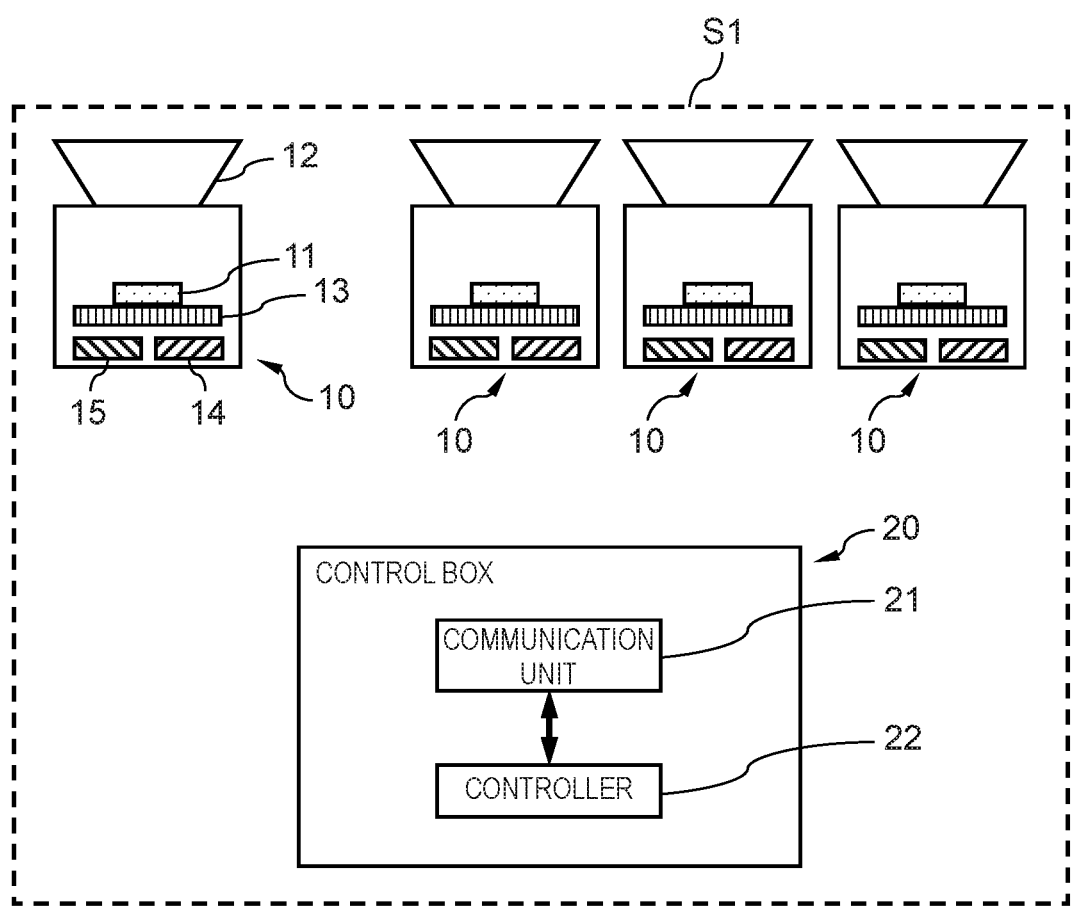
FIG. 1 is a schematic diagram of a projector system according to a first exemplary embodiment.

FIG. 1 is a schematic diagram of projector system S1 according to a first exemplary embodiment. Projector system S1 is configured with a plurality of (four in FIG. 1)

projectors 10 that project images, and control box 20 that communicates imaging data and position information with projectors 10.

As illustrated in FIG. 1, projector 10 includes projection unit 11, lens 12, imager 13, communication unit 14, and calculator 15.

Projection unit 11 displays and projects an image to be projected by projector 10. Projection unit 11 has a configuration such as a digital mirror device or liquid crystal on silicon (LCOS).

Lens 12 projects, on a projection target surface, an image projected by projection unit 11 while expanding or contracting it. Lens 12 has a configuration such as a zoom lens.

Imager 13 captures an image (second image) projected on the projection target surface by another projector 10, through lens 12. Imager 13 has a configuration such as a charge-coupled device (CCD) or a complementary metal oxide semiconductor (CMOS).

Communication unit 14 performs communication with other projectors 10 and control box 20. Communication unit 14 transmits position information about a position and a projection direction of own projector 10 (own projector), captured image data captured by imager 13, and distance information indicating an interval between another projector 10 and the projection target surface, and receives position information about a position and a projection direction of another projector 10, and a control signal from control box 20.

Calculation unit 15 calculates position information about the position of and the projection direction of own projector 10. Calculation unit 15 calculates the position by a global positioning system (GPS) and calculates the projection direction by a gyro sensor, for example. Then, calculation unit 15 calculates interval information indicating an interval between another projector 10 and own projector 10 from the position information of own projector 10 and the position information of other projector 10 received by communication unit 14.

Calculation unit 15 also calculates angle information indicating an angle between the projection direction of other projector 10 with respect to the projection target surface and an image capturing direction of own projector 10 through analysis of captured image data obtained by capturing, by imager 13, an image projected on the projection target surface by other projector 10. For example, the angle information can be calculated by analyzing a positional relationship among image elements of an image in the captured image data. Here, in the case where the projection target surface is three-dimensional, calculation unit 15 calculates angle information by means of a space coding method, for example. Then, from the angle information indicating an angle between the projection direction of other projector 10 on the projection target surface and the image capturing direction of own projector 10, and from triangulation using the interval information indicating an interval between other projector 10 and own projector 10, calculation unit 15 calculates distance L1 (first distance) between other projector 10 and the projection target surface by Expression 1 provided below.

Further, from the angle information indicating an angle between the projection direction of other projector 10 with respect to the projection target surface and the image capturing direction of own projector 10, and from the triangulation using the interval information indicating an interval between other projector 10 and own projector 10, calculation unit 15 calculates distance L2 (second distance) between own projector 10 and an area (an image projected on the projection target surface by other projector 10) on the projection target surface captured by imager 13 of own projector 10, by Expression 2 provided below.

$$L1 = x/\tan\theta \qquad \text{(Expression 1)}$$

$$L2 = x/\sin\theta \qquad \text{(Expression 2)}$$

Herein, L1 is a distance between another projector and a projection target surface (a perpendicular line from the other projector to the projection target surface), L2 is a distance between an own projector and an area (a measurement point on the projection target surface at distance L1) on the projection target surface captured by the own projector, x is an interval between the other projector and the own projector, and θ is an angle between a projection direction of the other projector and an image capturing direction of the own projector.

Since communication unit 14 and calculation unit 15 are provided as described above, projector 10 can acquire accurate information of the first distance between other projector 10 and the projection target surface, and accurate information of the second distance between own projector 10 and a second image on the projection target surface.

As illustrated in FIG. 1, control box 20 includes communication unit 21 and controller 22. Communication unit 21 performs communication with a plurality of projectors 10. Communication unit 21 receives position information about a position and a projection direction of projector 10, and distance information indicating a distance between projector 10 and a projection target surface, and transmits position information about a position and a projection direction of projector 10 and a control signal.

Controller 22 creates a layout diagram of projector 10 and the projection target surface based on the position information of the position and the projection direction of projector 10 received by communication unit 21 and the distance information indicating a distance between projector 10 and the projection target surface. Further, when there is a defect in the layout diagram of projector 10 and the projection target surface, controller 22 transmits a control signal via communication unit 21 to solve the defect. Furthermore, controller 22 has a recorder therein, and records the position information of the position and the projection direction of projector 10 received by communication unit 21, the distance information indicating a distance between projector 10 and the projection target surface, and the layout diagram of projector 10 and the projection target surface.

As described above, projector system S1 has control box 20, and further, each projector 10 has communication unit 14. Thereby, it is possible to achieve centralized management and high-level data processing.

Figure 2:
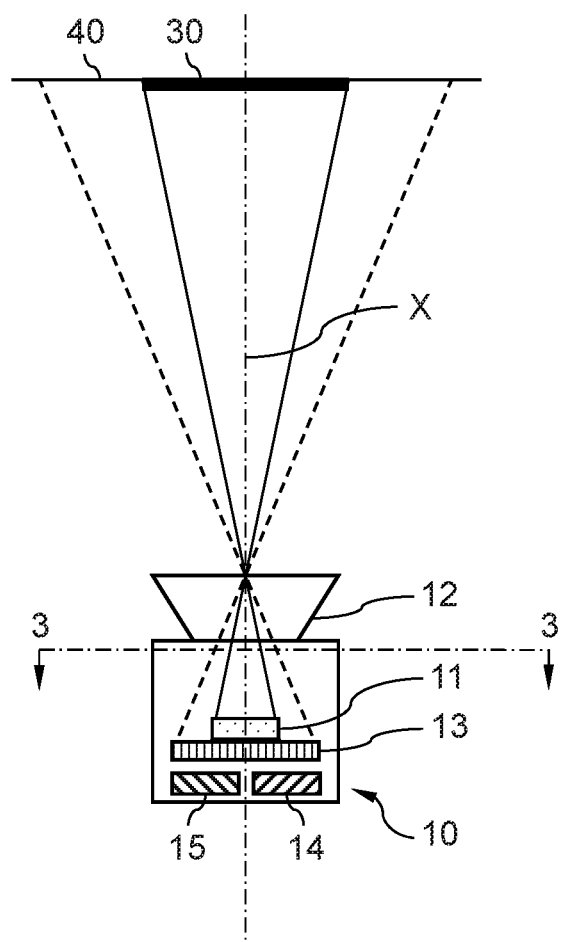
FIG. 2 is a schematic diagram illustrating projection and image capturing by a projector according to the first exemplary embodiment.
Figure 3:
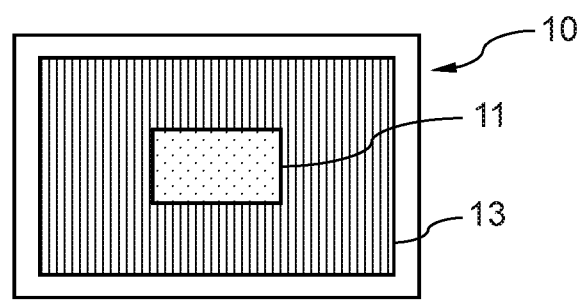
FIG. 3 is a layout diagram of a projection unit and an imager according to the first exemplary embodiment.

FIG. 2 is a schematic diagram illustrating projection and image capturing of projector 10 according to the first exemplary embodiment. FIG. 3 is a layout diagram of projection unit 11 and imager 13 in a cross-section taken along line 3-3 of FIG. 2 when viewed from a direction of lens 12. As illustrated in FIG. 2, projector 10 projects image 30 on projection target surface 40 as indicated by narrow solid lines, from projection unit 11 via lens 12. Projector 10 also captures surroundings of image 30 by imager 13 as indicated by broken lines from projection target surface 40 via lens 12. As illustrated in FIGS. 2 and 3, projection unit 11 is disposed on optical axis X for projecting an image. Imager 13 has a larger area than that of projection unit 11 when viewed from optical axis X direction, and is disposed in a state of being exposed from the outer periphery of projection unit 11. Imager 13 is disposed on optical axis X for projection of an image, on a side opposite to lens 12 of projection unit 11.

Thereby, imager 13 is able to capture a wide range of the outer periphery of image 30 projected on projection target surface 40. As described above, since projector 10 has an image capturing range outside the projection range of projected image 30, it is possible to capture image 30 of other projector 10 that is projected outside image 30 of own projector 10, while projecting image 30 of own projector 10. Further, since imager 13 has a larger area than that of projection unit 11 and can be disposed behind projection unit 11 (a side opposite to lens 12), it is not necessary to manufacture it in a special shape. This means that the volume of projector 10 is reduced, with low manufacturing cost.

Figure 4:
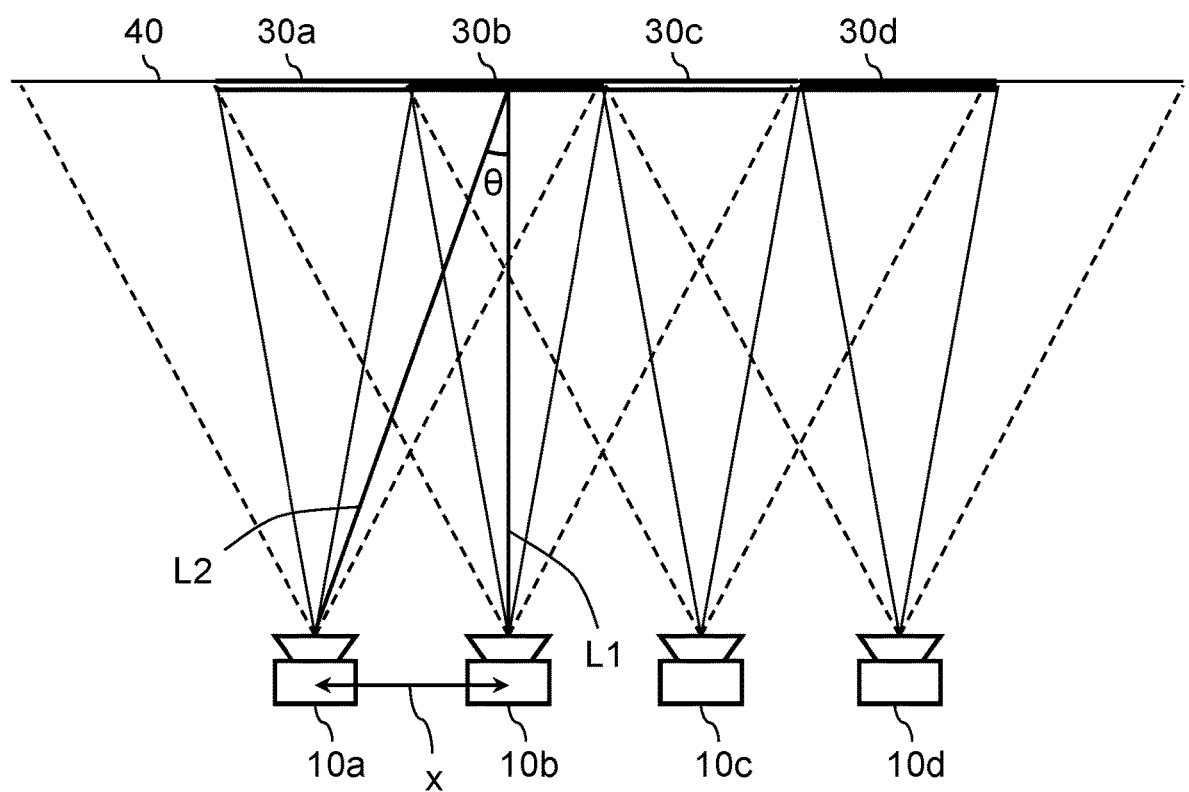
FIG. 4 is a schematic diagram illustrating projection and image capturing in the projector system according to the first exemplary embodiment.

Next, projection and image capturing of projector system S1, when a plurality of projectors 10 are arranged, will be described with reference to FIG. 4. FIG. 4 is a schematic diagram of projector system S1 in which the plurality of (four in FIG. 4) projectors 10a to 10d project images 30a to 30d, respectively.

Projectors 10a to 10d are aligned in a direction vertical to the projection direction. Images 30a to 30d are projected from projection units 11 of respective projectors onto projection target surface 40. Images 30a to 30d are projected side by side in a direction vertical to the projection direction from projectors 10a to 10d. It is preferable that projected images 30a to 30d are adjacent to each other without a gap. However, even if adjacent images overlap with each other, since at least part of image 30 projected by another projector 10 is projected outside the area of image 30 projected by own projector 10, own projector 10 is able to capture image 30 projected by other projector 10.

As illustrated in FIG. 4, projector 10a captures image 30b on the right side of image 30a, by imager 13 of projector 10a. Projector 10b captures image 30a on the left side of image 30b and image 30c on the right side thereof, by imager 13 of projector 10b. Projector 10c captures image 30b on the left side of image 30c and image 30d on the right side thereof, by imager 13 of projector 10c. Projector 10d captures image 30c on the left side of image 30d, by imager 13 of projector 10d. With use of captured data of images 30 of other projectors 10 captured by respective imagers 13 and position information of positions and projection directions of other projectors 10 received by communication units 14 of respective projectors 10a to 10d, projectors 10a to 10d calculate information of a first distance between projection target surface 40 and other projectors 10, by respective calculation units 15. Further, projectors 10a to 10d calculate information of a second distance between an area (image 30 on projection target surface 40 projected by other projector 10) on projection target surface 40 captured by own projector 10 and own projector 10, by respective calculation units 15.

In this way, the plurality of projectors 10a to 10d capture images 30a to 30d of other projectors 10a to 10d each other. Then, each of projectors 10a to 10d calculates the first distance between each of other projectors 10a to 10d and projection target surface 40, and the second distance between an own projector among projectors 10a to 10d and an area of each of images 30a to 30d captured by the own projector on projection target surface 40. Thereby, projector system S1 is configured with a half number of devices compared with a case where projection units and imagers are provided as separated devices that are projectors and cameras.

Further, the first distance between projector 10b and projection target surface 40 is calculated by two projectors 10a, 10c. The first distance between projector 10c and projection target surface 40 is calculated by two projectors 10b, 10d. Therefore, regarding the first distance between each of projectors 10b, 10c and projection target surface 40, calculation accuracy can be improved. In this way, when one projector captures a plurality of images, it is possible to enhance a degree of freedom of the projector system.

According to such a configuration, projection unit 11 and imager 13 use same lens 12, and when projection unit 11 projects the first image, imager 13 captures the second image of other projector 10 at the same time, and calculation unit 15 is able to calculate information of the first distance between projection target surface 40 and other projector 10. Further, calculation unit 15 is able to calculate information of the second distance between an area where own projector captures on projection target surface 40 and own projector 10. As described above, since projection unit 11 and imager 13 share one lens 12, it is possible to reduce a number of devices while reducing volume and cost of devices provided to the projector system.

Note that an image to be projected and an image to be captured may be visible light or invisible light. For example, the both may be visible light, while one of them may be invisible light (infrared light).

Note that while the present exemplary embodiment uses four projectors 10, it is also possible to use three units or five or more units of projectors 10.

Note that lenses 12 of respective projectors 10 may be different from one another. By changing a focal distance of lens 12 of each projector 10, it is possible to arbitrarily select a projection range and image capturing range. Thereby, a degree of freedom of a projector system can be increased.

In the present exemplary embodiment, communication unit 14 receives position information of other projectors 10 and calculation unit 15 calculates interval information. However, it is possible to arrange a plurality of projectors 10 at predetermined intervals or record interval information at the time of arrangement on a recorder of calculation unit 15 of each projector 10. Thereby, it is possible to configure a projector and a projector system having no communication unit 14.

In the present exemplary embodiment, shapes of projection unit 11 and imager 13 are rectangular. However, shapes are not particularly limited. For example, projection unit 11 and imager 13 may be circular or in a shape in which four corners are chamfered. Particularly, when imager 13 has a shape corresponding to an image circle of a lens, it is possible to use a wider range of the image circle and the image capturing range is widened, compared with a case where imager 13 is in a rectangular shape.

Figure 5:
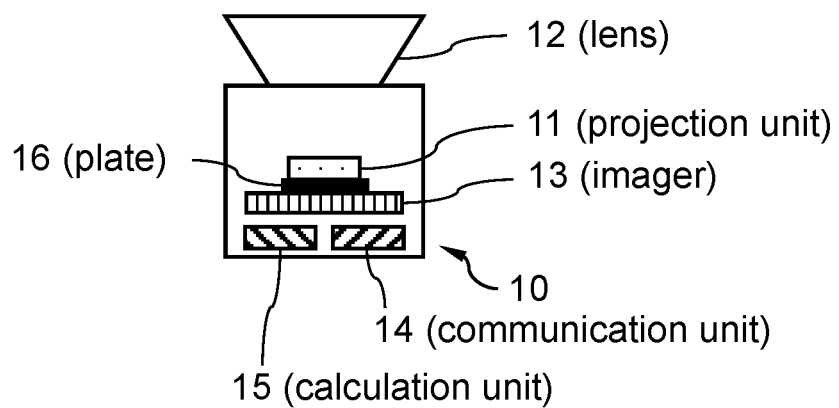
FIG. 5 is a schematic diagram of another projector according to the first exemplary embodiment.

In the present exemplary embodiment, it has been described that projection unit 11 and imager 13 are in contact with each other as in FIG. 1. However, an interval between projection unit 11 and image 13 is not particularly limited. For example, projection unit 11 and imager 13 may be spaced apart from each other. Alternatively, plate 16 made of metal, resin, or the like may be disposed between projection unit 11 and imager 13 as illustrated in FIG. 5. In that case, it is possible to clearly divide a range not captured by imager 13. Therefore, image capturing sensitivity can be improved.

Figure 6:
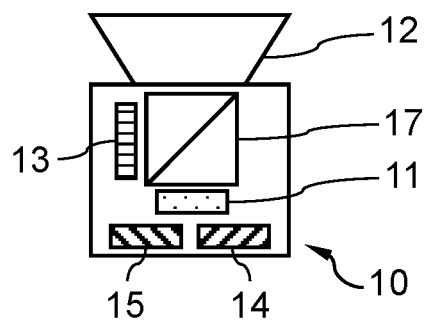
FIG. 6 is a schematic diagram of another projector according to the first exemplary embodiment.

In the present exemplary embodiment, while it has been described that projection unit 11 and imager 13 are arranged in an overlapped manner on optical axis X, it is possible to divide an optical path by using an optical path splitter. As illustrated in FIG. 6, projector 10 includes therein prism 17 as the optical path splitter, and projection unit 11 and imager 13 are disposed on different surfaces of prism 17. Visible light from projection unit 11 travels straight ahead through prism 17 and is projected through lens 12. Invisible light to be captured is reflected at prism 17 through lens 12, and is captured by imager 13. With this configuration, there is no need to overlap projection unit 11 and imager 13, and a component having imager 13 of a larger area is not needed. Therefore, cost can be saved. Further, the image capturing range by imager 13 can be set to a desired range by changing a reflection angle of prism 17. Furthermore, the optical path splitter may be a flat-plate dichroic mirror or a diffraction grating, for example, besides the prism. If wavelengths of light to which light path division is applied are identical or close to each other, it is possible to use a half mirror as the optical path splitter.

Figure 7:
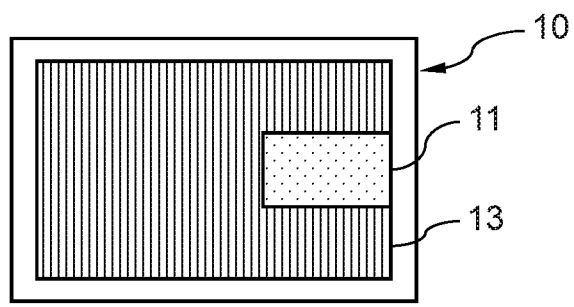
FIG. 7 is a layout diagram of another projection unit and another imager according to the first exemplary embodiment.

In the present exemplary embodiment, while imager 13 is disposed to surround an entire periphery of projection unit 11, it may not surround the entire periphery. For example, imager 13 may not be present on a right side of projection unit 11 as illustrated in FIG. 7. In that case, imager 13 on a left side of projection unit 11 can image a wider range. As described above, imager 13 is not needed to be disposed equally on an outside of projection unit 11. It is possible to give a bias to the arrangement depending on a position of image 30 to be captured.

Figure 8:
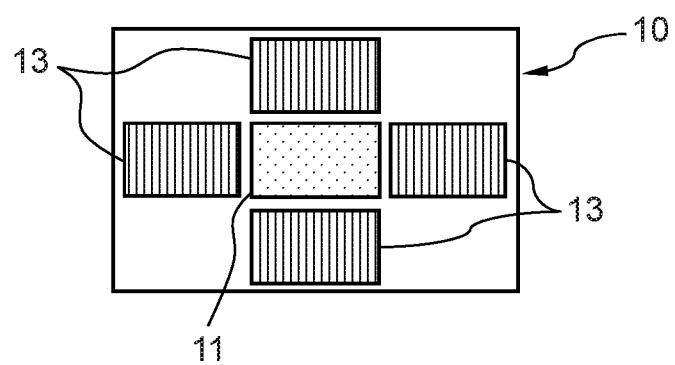
FIG. 8 is a layout diagram of another projection unit and another imager according to the first exemplary embodiment.

In the present exemplary embodiment, while a number of imager 13 is one, it may be divided into a plurality of pieces. For example, four imagers 13 may be disposed on up, down, left, and right sides of projection unit 11 as in FIG. 8, or one imager 13 may be provided beside one projection unit 11. In that case, since a component having a small imager 13 can be used, manufacturing cost can be suppressed, compared with a case of using a component having a large imager 13 or a component in a special shape.

Figure 9:
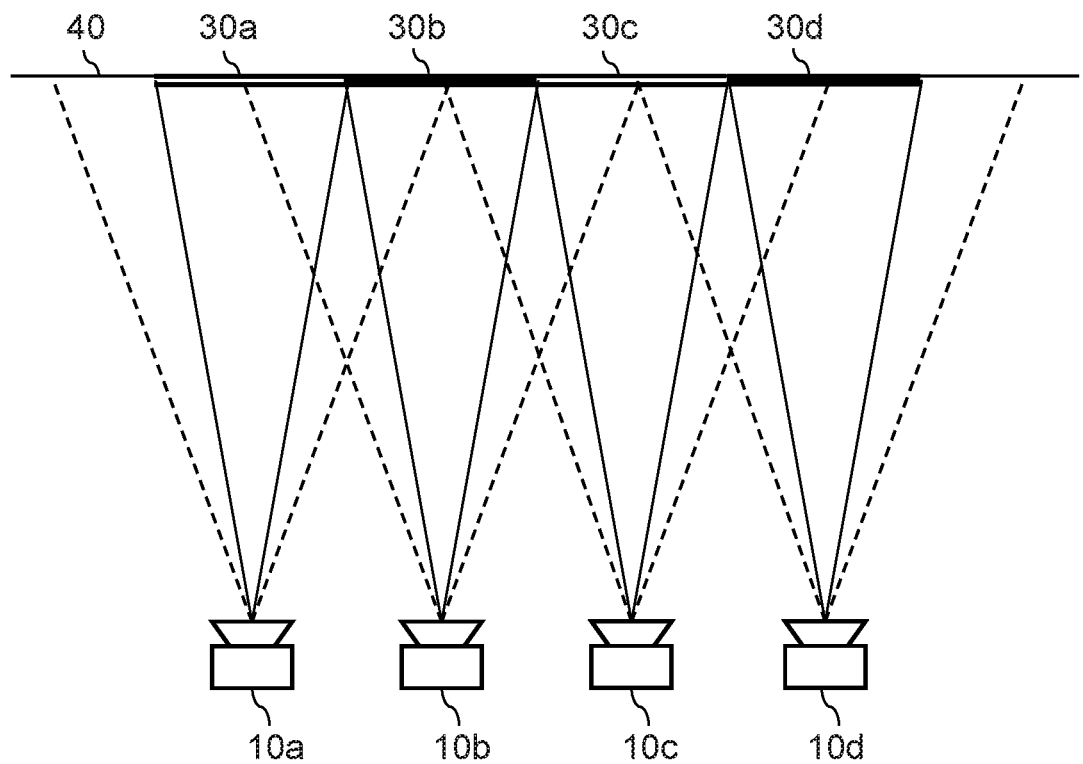
FIG. 9 is a schematic diagram illustrating projection and image capturing in another projector system according to the first exemplary embodiment.

In the present exemplary embodiment, a case where one projector 10 captures entire image 30 of other projector 10 adjacent thereto has been shown, as illustrated in FIG. 4. However, projectors 10a, 10c each may capture a half of image 30b of projector 10b adjacent thereto, as illustrated in FIG. 9. That is, two projectors 10 may capture parts of image 30 of other projector 10 adjacent thereto. In that case, an area of imager 13 can be reduced.

In the present exemplary embodiment, while projector 10 includes calculation unit 15, control box 20 may include a calculation unit. In that case, projector 10 may transmit, by communication unit 14, position information of own projector 10 and captured image data of the image of other projector 10, control box 20 may, by communication unit 21, receive the position information and the captured image data transmitted from each projector 10, and the calculation unit provided to control box 20 may calculate the first distance between projection target surface 40 of the image and each projector 10 from the position information and the captured image data. Further, from the position information and the captured image data, the calculation unit provided to control box 20 may calculate the second distance between the area of the image on projection target surface 40 captured by each projector 10 and each projector 10.

Note that in the present exemplary embodiment, while projector 10 includes imager 13, imager 13 may not share lens 12 and may be provided to a camera (imaging device) independent of projector 10. In that case, the imager of the camera captures image 30 projected by second projector 10 on projection target surface 40 to generate captured image data, and transmits it to the calculation unit. Then, from position information of second projector 10 and the camera and the captured image data, the calculation unit calculates the first distance between the area of image 30 (second image) on projection target surface 40 and second projector 10, and the second distance between the area of image 30 (second image) on projection target surface 40 and the camera. In that case, the calculation unit may be provided to projector 10 or control box 20. It is preferable that the camera and the projector are configured in a same housing. Thereby, a number of devices is reduced, and handling of an entire projector system is facilitated. Also in that case, projection unit 11 of first projector 10 is able to control projection of image 30 (first image) to be projected by own projector 10 based on the first distance or the second distance.

Second Exemplary Embodiment

In the first exemplary embodiment, description has been given on a case where a plurality of projectors 10 are arranged side by side in a line, one projector 10 captures images 30 of two other projectors 10 arranged on both sides thereof, and distances between two other projectors 10 and projection target surface 40 are calculated. A second exemplary embodiment differs from the first exemplary embodiment in that a plurality of projectors 10 are arranged in a lattice form, one projector 10 captures image 30 of another projector 10 disposed nearby, and calculates a first distance between other projector 10 and projection target surface 40 and a second distance between own projector 10 and an area of image 30 projected on projection target surface 40 by other projector 10.

Figure 10:
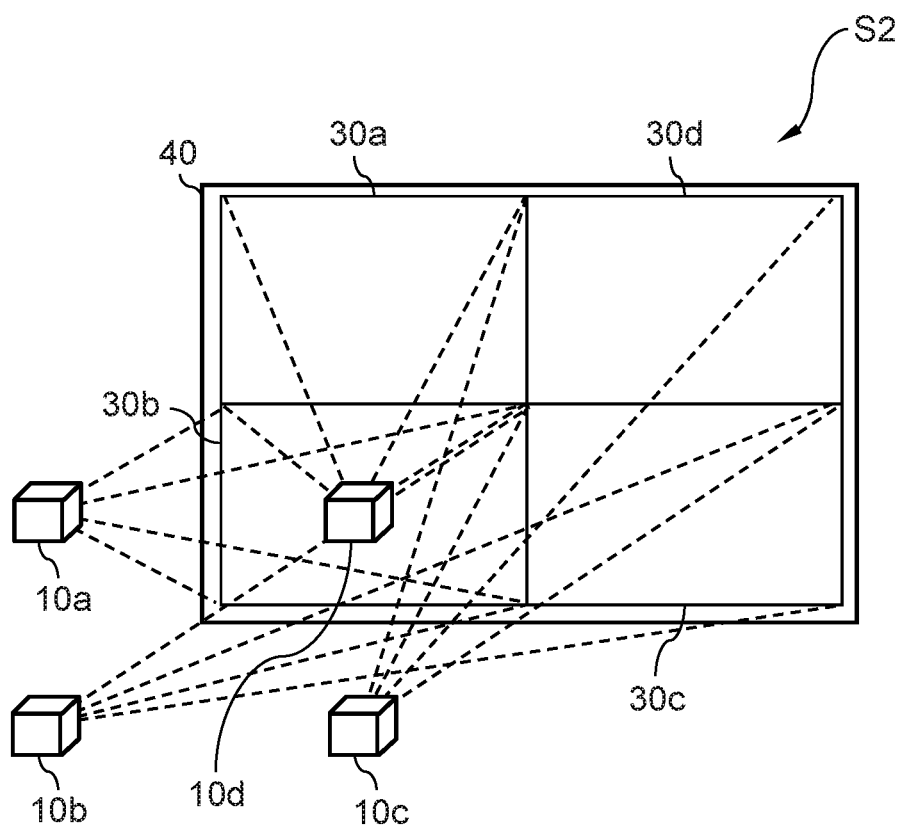
FIG. 10 is a schematic diagram illustrating projection and image capturing in a projector system according to a second exemplary embodiment.

FIG. 10 is a schematic diagram of projector system S2 according to the second exemplary embodiment. In FIG. 10, same components as those of the first exemplary embodiment are denoted by same reference numerals, and description thereof will not be repeated.

A plurality of (four in FIG. 10) projectors 10a to 10d are arranged in a lattice form, and project images 30a to 30d in a lattice form, respectively. Then, projectors 10a, 10b, 10c, and 10d capture images 30b, 30c, 30d, and 30a of projectors 10b, 10c, 10d, and 10a positioned in a counterclockwise direction in a lattice form, respectively. Broken lines shown in FIG. 10 indicate correspondence relationships between projectors 10a, 10b, 10c, and 10d and images 30b, 30c, 30d, and 30a captured by them, respectively.

This means that projector 10a projects image 30a, and at the same time, captures image 30b of projector 10b. Projector 10b projects image 30b, and at the same time, captures image 30c of projector 10c. Projector 10c projects image 30c, and at the same time, captures image 30d of projector 10d. Projector 10d projects image 30d, and at the same time, captures image 30a of projector 10a.

Description will be given on a projector system in which n units of (in FIG. 10, n=4) projectors 10k (k=an integer of 1 to n) are arranged in a lattice form. Projectors 10k projects images 30k in a lattice form similar to the arrangement of projectors 10k. Then, projector 10k captures image 30k of another projector 10k adjacent thereto as indicated by the broken lines of FIG. 10. Image 30k of other projector 10k, to be captured by projector 10k, may be set appropriately according to the arrangement of projector 10k in the lattice form.

That is, while projectors 10 are arranged in a lattice form of two rows by two columns in the present exemplary embodiment, another arrangement is also possible. For example, in a case of two rows by (three columns or more), (three rows or more) by two rows, by capturing images 30 of other projectors 10 in a counterclockwise direction or a clockwise direction, it is possible to measure first distances between respective projectors 10 and projection target surface 40 and second distances between respective projectors 10 and areas of images 30 projected on projection target surface 40 by other projectors 10, as illustrated in FIG. 10. Moreover, in a case of (three rows or more) by (three columns or more), projectors 10 on outermost periphery and projectors 10 forming a loop inside thereof are able to capture images 30 of other projectors 10 similarly.

Each projector 10$k$ has projection unit 11 that displays and projects image 30$k$, lens 12 that expands and contracts image 30$k$ projected by projection unit 11, imager 13 that captures image 30 projected by other projector 10$k$ via lens 12, and calculation unit 15. Then, from captured image data of image 30$k$ of other projector 10$k$ captured by imager 13, calculation unit 15 calculates a first distance between other projector 10$k$ and projection target surface 40 of image 30$k$ of other projector 10$k$, and a second distance between own projector 10$k$ and an area of image 30$k$ projected on projection target surface 40 by other projector 10$k$.

That is, each projector 10$k$ ($k$=1 to n−1) has calculation unit 15 that calculates the first distance between projection target surface 40 of image 30$k$ ($k$=2 to n) and projector 10$k$ ($k$=2 to n) from captured image data of image 30$k$ ($k$=2 to n) captured by imager 13, and the second distance between projector 10$k$ ($k$=1 to n−1) and each area of image 30$k$ ($k$=2 to n). Projector 10$k$ ($k$=n) has calculation unit 15 that calculates the first distance between projection target surface 40 of image 30$k$ ($k$=1) and projector 10$k$ ($k$=1) from captured image data of image 30$k$ ($k$=1) captured by imager 13, and the second distance between projector 10$k$ ($k$=n) and an area of image 30$k$ ($k$=1).

As described above, since a plurality of projectors 10$k$ capture images 30$k$ of other projectors 10$k$ with each other, it is possible to detect distances by projection and image capturing performed many times. With such a configuration, it is possible to achieve projector system S2 in which a projection range and an image capturing range are wide in up, down, left, and right. At that time, projector system S2 is configured with a half number of devices, compared with a case where projection units and imagers are provided as separated devices that are projectors and cameras.

Figure 11:
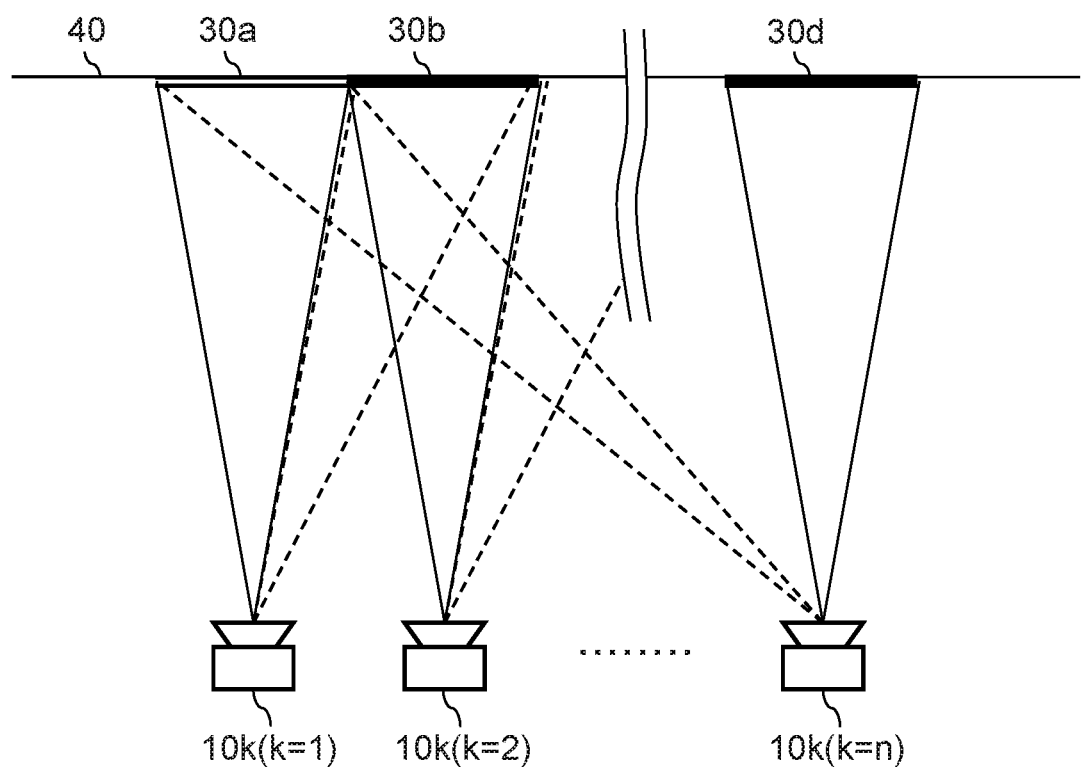
FIG. 11 is a schematic diagram illustrating projection and image capturing in another projector system according to the second exemplary embodiment.

While the present exemplary embodiment has shown the case where four projectors 10$a$ to 10$d$ are arranged in a lattice form in FIG. 10, it is possible to arrange n units of projectors 10$k$ ($k$=1 to n) side by side in a line as illustrated in FIG. 11. In that case, projectors 10$k$ project images 30$k$ side by side in a line similar to the arrangement of projectors 10$k$. Then, projector 10$k$ ($k$=1 to n−1) captures image 30$k$ of other projector 10$k$+1 on a right side thereof, and projector 10$k$ ($k$=n) captures image 30$k$ ($k$=1) of leftmost projector 10$k$ ($k$=1). In that case, in projector 10$k$ ($k$=n), it is necessary to dispose imager 13 at a position where image 30$k$ ($k$=1) can be captured.

Other Exemplary Embodiments

In the first and second present exemplary embodiments, description has been given based on an assumption that projection target surface 40 has a flat surface shape and is fixed. However, projection target surface 40 may have a three-dimensional shape, and a projection area of a projector system may move. That is, projection target surface 40 may be a surface of a projection target such as a ball, a balloon, or clothes worn by a person, and such a projection target may move.

Figure 12:
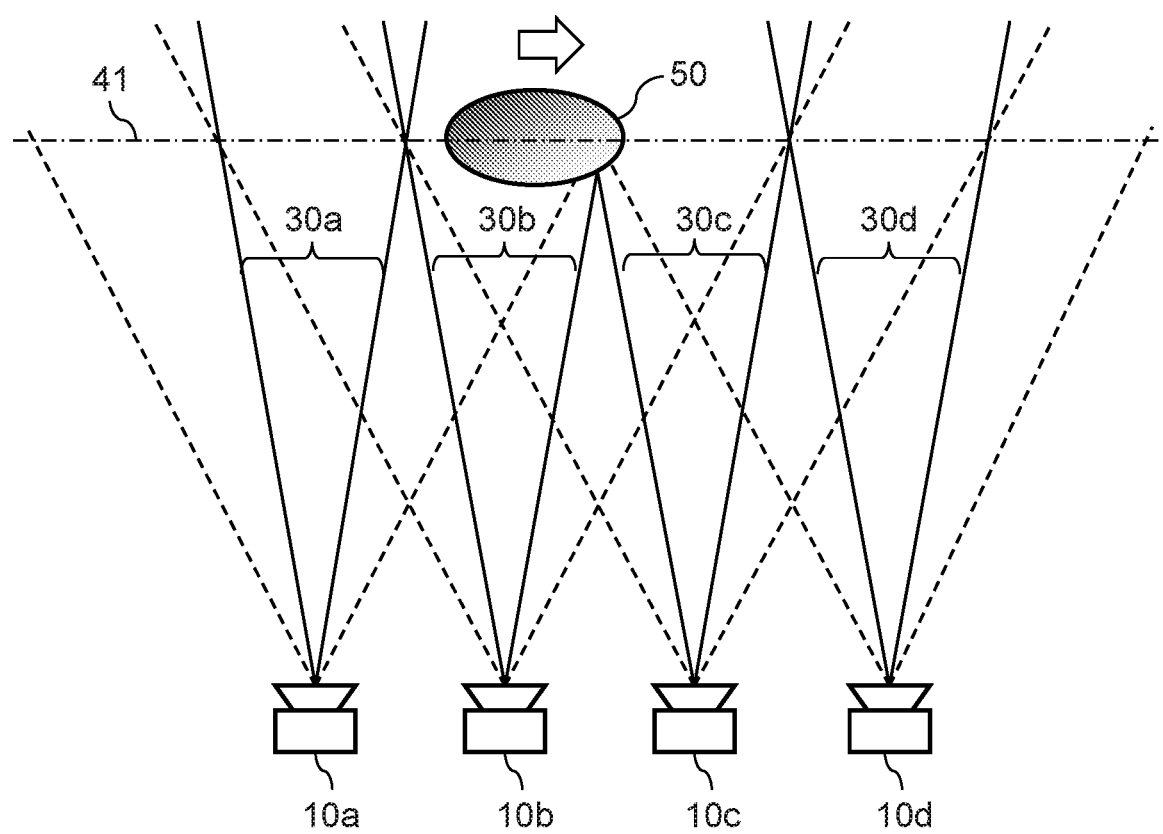
FIG. 12 is a schematic diagram of a projector system for projecting an image onto a projection target according to another exemplary embodiment.

FIG. 12 is a schematic diagram of a projector system in which an image is projected onto a projection target 50 that moves. Four projectors 10$a$ to 10$d$ are arranged side by side in a line, and project images 30$a$ to 30$d$ onto virtual projection target surface 41, respectively. As described in the first exemplary embodiment, projectors 10$a$ to 10$d$ are able to capture images projected by other projectors, by respective imagers 13 thereof. Broken lines shown in FIG. 12 indicate image capturing ranges of projectors 10$a$ to 10$d$, respectively. The image capturing range is changeable by a configuration of imager 13, as described in the first exemplary embodiment. In an example illustrated in FIG. 12, projection target 50 moves in a right direction (a direction from projector 10$a$ toward projector 10$d$) on virtual projection target surface 41. Then, on the surface of projection target 50, parts of images 30$b$, 30$c$ projected by projectors 10$b$, 10$c$, respectively, are projected.

Image 30$b$ projected on projection target 50 is captured by imager 13 of projector 10$a$, whereby projector 10$a$ acquires captured image data of image 30$b$. Calculation unit 15 of projector 10$a$ calculates, from the captured image data of image 30$b$ and interval information indicating an interval between projectors 10$a$, 10$b$, a first distance between projector 10$b$ and a surface of projection target 50 on which image 30$b$ is projected, and a second distance between projector 10$a$ and an area of image 30$b$ projected on the surface of projection target 50.

Similarly, image 30$b$ projected on projection target 50 is also captured by imager 13 of projector 10$c$, and calculation unit 15 of projector 10$c$ is also able to calculate a first distance between projector 10$b$ and the surface of projection target 50 and a second distance between projector 10$c$ and an area of image 30$b$. Similarly, image 30$c$ projected on projection target 50 is also captured by imagers 13 of respective projectors 10$b$, 10$d$, and each calculation unit 15 thereof calculates a first distance between projector 10$c$ and the surface of projection target 50 on which image 30$c$ is projected, and a second distance between each of projectors 10$b$, 10$d$ and an area of image 30$c$.

As described above, by calculating the first distance between each of projectors 10$b$, 10$c$ and the surface of projection target 50 on which images 30$b$, 30$c$ are projected, or the second distance between each projector 10$a$, 10$d$ that captures each image 30$b$, 30$c$ and the area of each image 30$b$, 30$c$, it is possible to perform control such that two images 30$b$, 30$c$ projected on the surface of moving projection target 50 continue without a gap. A case where image 30$b$ and image 30$c$ are projected on projection target 50 has been described above. This also applies to a case where images 30$a$, 30$d$ are projected on projection target 50.

INDUSTRIAL APPLICABILITY

In a projector and a projector system according to the present disclosure, volume of devices and a number of devices can be reduced, so that they can be installed in an inexpensive manner and easily. Therefore, they are effective as a projector and the like.

What is claimed is:
1. A projector comprising:
a first projection unit that projects a first image;
a first imager that captures a second image projected by another projector; and
a first calculation unit that calculates, from captured image data of the second image captured by the first imager and interval information indicating an interval between the other projector and the projector, a first distance between a surface on which the second image is projected and the other projector, or a second distance between an area in which the second image is projected and the projector, wherein the first projection unit controls projection of the first image based on the first distance or the second distance.

2. The projector according to claim 1, wherein
the first projection unit projects the first image via a lens, and
the first imager captures the second image via the lens.

3. The projector according to claim 2, wherein
the first projection unit is disposed on an optical axis of the first image to be projected, and
the first imager is disposed outside the first projection unit with respect to the optical axis.

4. The projector according to claim 3, wherein the first imager is divided into a plurality of parts.

5. The projector according to claim 3, wherein the first imager is disposed on a side opposite to the lens of the first projection unit in a direction of the optical axis.

6. The projector according to claim 1, wherein the first calculation unit calculates angle information indicating an angle between a projection direction and an image capturing direction of the second image from captured image data of the second image, and calculates the first distance or the second distance from the angle information and the interval information.

7. The projector according to claim 1, further comprising a first communication unit that receives, from the other projector, position information of the other projector,
wherein the first calculation unit calculates the interval information based on the position information of the other projector received by the first communication unit.

8. The projector according to claim 1, wherein the first imager is disposed on a side opposite to the lens of the first projection unit on the optical axis of the first image to be projected, and has a larger area than an area of the first projection unit.

9. The projector according to claim 1, further comprising an optical path splitter that divides an optical path from the first projection unit to the first image and an optical path from the second image to the first imager.

10. The projector according to claim 1, wherein at least a part of the second image captured by the first imager is in an area of the first image projected from the first projection unit.

11. A projector system comprising:
a first projector that is the projector according to claim 1, and
a second projector that is the other projector.

12. The projector system according to claim 11, wherein the second projector includes
a second projection unit that projects the second image,
a second imager that captures the first image, and
a second calculation unit that calculates, from captured image data of the first image captured by the second imager and interval information indicating an interval between the first projector and the second projector, a third distance between a surface on which the first image is projected and the first projector, or a fourth distance between an area in which the first image is projected and the second projector.

13. The projector system according to claim 11, further comprising a third projector that projects a third image,
wherein the first calculation unit calculates, from captured image data of the third image captured by the first imager and interval information indicating an interval between the third projector and the first projector, a fifth distance between a surface on which the third image is projected and the third projector, or a sixth distance between an area in which the third image is projected and the first projector.

14. A projector system comprising:
n projectors consisting of first to n-th projectors, where n is an integer,
wherein when the first to (n−1)th projectors each serve as the projector according to claim 1, the second to the n-th projectors each serve as the other projector, respectively, and
when the n-th projector serves as the projector according to claim 1, the first projector serves as the other projector.

15. A projector system comprising:
a first projector that projects a first image;
a second projector that projects a second image; and
a control box that performs communication with the first projector and the second projector,
wherein
the first projector includes
a first projection unit that projects the first image,
a first imager that captures the second image, and
a first communication unit that transmits position information of the first projector and captured image data of the second image captured by the first imager,
the second projector includes a second communication unit that transmits position information of the second projector,
the control box includes
a third communication unit that receives the position information of the first projector and the captured image data from the first communication unit, and receives the position information of the second projector from the second communication unit, and
a third calculation unit that calculates, from the position information of the first projector and the position information of the second projector, interval information indicating an interval between the first projector and the second projector, and calculates, from the captured image data and the interval information, a first distance between a surface on which the second image is projected and the second projector, or a second distance between an area in which the second image is projected and the first projector, and
the control box controls projection of the first image by the first projection unit based on the first distance or the second distance.

16. A projector system comprising:
a first projector that projects a first image;
a second projector that projects a second image;
an imaging device that captures the second image; and
a calculation unit that calculates, from captured image data of the second image captured by the imaging device and position information of the first projector, the second projector, and the imaging device, a first distance between a surface on which the second image is projected and the second projector, or a second distance between an area in which the second image is projected and the imaging device,
wherein the first projector controls projection of the first image based on the first distance or the second distance.

17. The projector system according to claim 16, wherein the calculation unit calculates angle information indicating an angle between a projection direction and an image capturing direction of the second image from the captured image data of the second image, and calculates the first distance or the second distance from the angle information and the position information.

* * * * *